G. W. STIGLEMAN.
Preparation of Photographic Negatives.

No. 201,065. Patented March 5, 1878.

Witnesses:
W. Burris
G. B. Towles

Inventor:
George W. Stigleman,
by Theodore Mungen,
Attorney.

UNITED STATES PATENT OFFICE.

GEORGE W. STIGLEMAN, OF RICHMOND, INDIANA.

IMPROVEMENT IN THE PREPARATION OF PHOTOGRAPHIC NEGATIVES.

Specification forming part of Letters Patent No. 201,065, dated March 5, 1878; application filed February 16, 1877.

*To all whom it may concern:*

Be it known that I, GEORGE W. STIGLEMAN, of Richmond, in the county of Wayne and State of Indiana, have invented certain new and useful Improvements in Photography; and I do hereby declare that the following is a full, clear, and exact description of the same, reference being had to the accompanying drawing, forming part of this specification, in which—

Figure 1:
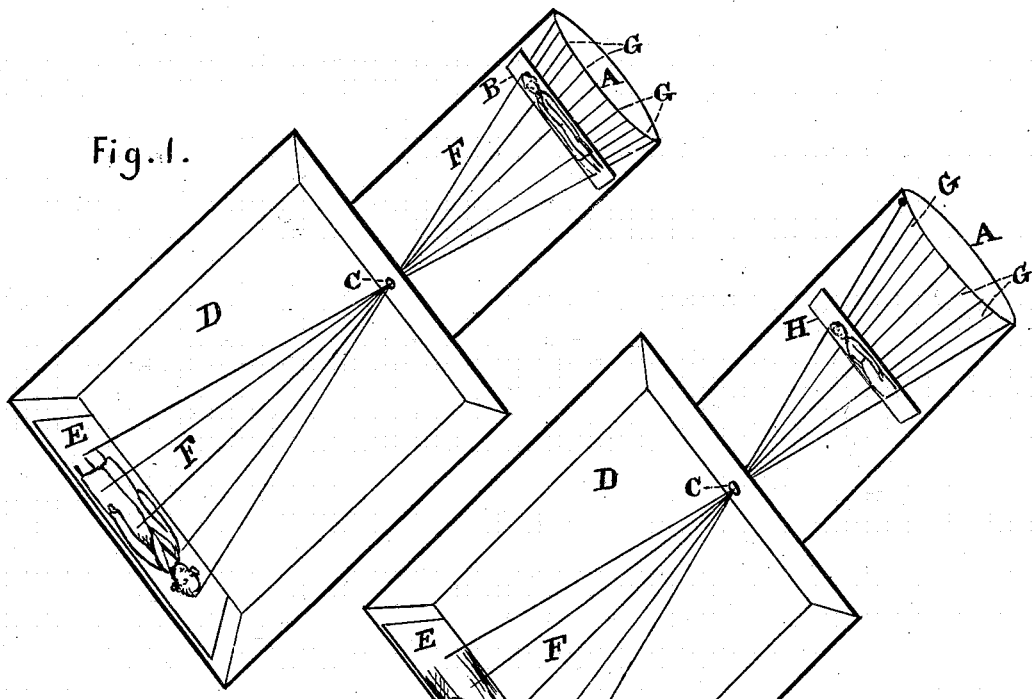
Figure 2:
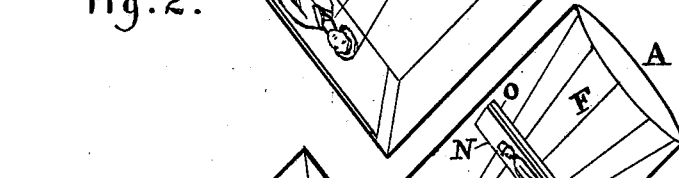
Figure 3:
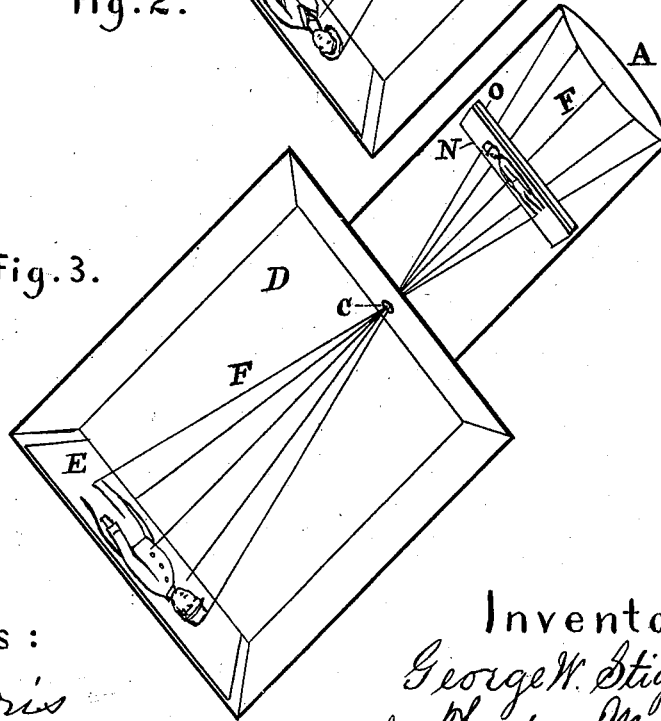

Figure 1 represents a sectional view of a solar camera in which is placed a photographic negative which has been simply varnished, or varnished and retouched, in the ordinary manner, showing the obstructed and unobstructed rays of light, the obstructed rays being produced by the deflection of the rays by globules, granulations, or waves in the varnish, or by the scratchings and breakings on the varnished surface. Fig. 2 represents a sectional view of a solar camera in which is placed a photographic negative which has been varnished with a gelatine or other varnish insoluble in balsam of fir or any other resinous substance at any temperature of heat, retouched and covered with a coating of balsam of fir, showing the obstructed and unobstructed rays of light, the former being fewer than in Fig. 1; and Fig. 3 represents a sectional view of a solar camera in which is placed a photographic negative which has been varnished with a gelatine or other varnish insoluble in balsam of fir or any other resinous substance at any temperature of heat, retouched and covered with a coating of balsam of fir pressed upon it by a clear plate of glass, while kept heated, with sufficient force to exclude all air-bubbles and fill all inequalities in the retouched surface of the negative, and give the two plates, when united by binding at the edges, the appearance of a single plate of glass having a perfect negative in its center, showing the rays of light wholly unobstructed at all points where they should pass to the photograph.

In photography, it is well known that waves caused by the uneven flow of the varnish frequently appear in drying the varnished negative, which, in the printing, are transmitted to the photograph; that the coarse granulated particles deposited by the developer causes the varnish to form in globules around them in drying, and thus form small hemispheres or lenses, which obstruct the rays of light at their centers, and cause them to pass around their sides, thereby forming white specks upon the surface of the photograph.

Scratchings and white markings are caused in the photograph by the obstruction of the rays of light by the broken or scratched surface of the varnished negative where it has been altered by the retouching-pencil, and these defects have to be remedied by retouching the photograph with india-ink, necessitating a great waste of time and labor, and even after all is done the photograph lacks brilliancy, and clearness in the shadows, and purity in the high lights.

To obviate these defects in the photograph, by properly preparing the negative, is the object of this invention; and to these ends it consists in attaching to the manipulated side of a photographic negative prepared with a gelatine or other varnish insoluble in balsam of fir or any other suitable resinous substance at any temperature of heat, and retouched by the ordinary means known to the art, a clear plate of glass by heating the negative and the clear plate of glass to prevent breakage, and pouring upon one or the other of them a quantity of balsam of fir, or any other suitable resinous substance, and firmly pressing the two plates together in a press, or by other suitable means, while kept heated, with sufficient force to remove all air-bubbles that may be created between them, and to drive to the edges of the plates all surplus balsam, which should be removed, and the plates bound at their edges to prevent the springing of the plates while under the heat of the condensing-lens in the solar camera, for the purpose of removing all scratches or breakages in the varnished surface of the negative, and thus preventing their reproduction in their magnified proportions in the enlarged photograph, by filling with the balsam of fir all unevenness caused by waves, globules, scratches, or other imperfections in the manipulated surface of the negative, that would otherwise obstruct, deflect, diffuse, or diverge the rays of light that should pass directly to the photograph, thereby making the two plates appear as one, with a perfect negative in the center, in which all of the retouched portions are preserved as perfectly as if they had been placed there by the developer itself.

In the accompanying drawings the figures represent sectional views of a solar camera in which the negative is placed to print the enlarged photograph. It will be seen at a glance that all imperfections in the negative will be reproduced in magnified proportions in the enlarged photograph.

In the several figures, A represents the condensing-lens; C, the object-lens; D, the dark-box or inside of the camera; E, the photograph, and F the unobstructed rays of light.

In Fig. 1 the negative B is represented as retouched, but not prepared by the process herein described. The lines F represent the unobstructed rays of light which pass to the photograph E. The lines G represent the obstructed rays of light which pass to the negative B, and are there deflected and diffused, as shown, by globules, granulations, waves, &c., in the varnished surface of the negative, or by the hatching, stippling, scumbling, or other markings from the retouching-pencil or india-ink, causing the same to be reproduced in magnified proportions in the enlarged photograph.

In Fig. 3, N represents a negative prepared with a gelatine or other varnish insoluble in balsam of fir or any other suitable resinous substance at any temperature of heat. Said negative plate, after having been first retouched in the ordinary manner known to the art, is, together with a clear-glass plate, O, heated to prevent breakage, and a quantity of balsam of fir, or its equivalent, is poured upon one or the other of the plates N or O, and the two plates are pressed firmly together in a press, or by other suitable means, while heated, with sufficient force to exclude all air from between them and to drive to their edges all surplus balsam. When the balsam of fir has become dry and hardened by heat the plates are taken from the press, the surplus balsam removed from their edges, and the edges bound with stiff sticking-paper, to prevent them from springing apart when under the heat of the solar camera.

By this process all the scratches and fractures in the varnished surface of the negative are taken out by filling them up with the balsam of fir between the plates, and all globules or granulated particles, waves, and all other unevenness of the varnished surface that would otherwise obstruct, deflect, diffuse, and diverge the required rays of light are filled up, and the varnished surface of the negative made perfectly even, so that the necessary rays of light will not, in the slightest degree, be obstructed, deflected, or diffused from their legitimate course, and the negative thus prepared will have the appearance of a single plate of glass with a perfect negative in its center, while the skill of the artist in retouching will be preserved precisely as he left it until the negative shall be accidentally broken or designedly destroyed.

An unlimited number of photographs may be printed from a negative thus prepared, not one of which will need the slightest retouching in india-ink.

Having thus described my improvements, what I claim as new and useful, and desire to secure by Letters Patent, is—

1. The process herein described of preparing photographic negatives by coating the same with a gelatine or other varnish insoluble in balsam of fir or equivalent substance, and attaching to the varnished and retouched surface of said negative a plate of clear glass by heating both negative and clear glass to prevent breakage, and pouring upon one or the other of them a quantity of balsam of fir or equivalent substance, and pressing and retaining said plates together while kept heated, to exclude air-bubbles, and remove unevenness between them, and dry the varnishes, substantially in the manner and for the purposes set forth.

2. A photographic negative prepared by coating an ordinary negative with a gelatine or other varnish insoluble in balsam of fir or equivalent substance, and attaching to the varnished and retouched surface a plate of clear glass by heating both negative and clear plate to prevent breakage, and pouring upon either of them a quantity of balsam of fir or equivalent substance, and pressing and retaining said plates together, while kept heated, to exclude air-bubbles, to remove unevenness, and to dry the varnishes, substantially as hereinbefore set forth.

In testimony that I claim the foregoing improvements, as above described, I have hereunto set my hand and seal this 12th day of January, 1877.

GEORGE W. STIGLEMAN. [L. S.]

Witnesses:
WM. R. WEBSTER,
G. H. DUNHAM.